United States Patent

Ohrbom et al.

[11] Patent Number: 5,907,024
[45] Date of Patent: May 25, 1999

[54] HIGH SOLIDS THERMOSETTING COMPOSITIONS WITH DUAL CURE MECHANISM

[75] Inventors: Walter H. Ohrbom, Hartland Township; Paul J. Harris, West Bloomfield, both of Mich.

[73] Assignee: BASF Corporation, Southfield, Mich.

[21] Appl. No.: 08/968,387

[22] Filed: Nov. 12, 1997

[51] Int. Cl.$^6$ .................................................. C08G 18/62
[52] U.S. Cl. .............................. 528/75; 528/85; 525/123; 427/385.5; 428/422.8
[58] Field of Search ................................. ; C08G 18/62

[56] References Cited

U.S. PATENT DOCUMENTS

| | | | |
|---|---|---|---|
| 3,375,227 | 3/1968 | Hicks | 525/162 |
| 3,479,328 | 11/1969 | Nordstrom | 526/312 |
| 3,674,838 | 7/1972 | Nordstrom | 560/166 |
| 4,102,847 | 7/1978 | Hartmann et al. | 524/509 |
| 4,239,866 | 12/1980 | Reitel et al. | 525/440 |
| 4,520,167 | 5/1985 | Blank et al. | 525/131 |
| 4,581,430 | 4/1986 | Phan et al. | 526/246 |
| 4,677,168 | 6/1987 | Hoy et al. | 525/441 |
| 4,758,632 | 7/1988 | Parekh et al. | 525/383 |
| 4,814,382 | 3/1989 | Hy et al. | 525/113 |
| 4,892,906 | 1/1990 | Pham et al. | 524/730 |
| 5,115,015 | 5/1992 | Richey, Jr. et al. | 524/507 |
| 5,342,888 | 8/1994 | Sudo | 525/124 |
| 5,373,069 | 12/1994 | Rehfuss et al. | 525/456 |
| 5,412,049 | 5/1995 | Argyropoulos et al. | 526/312 |
| 5,451,656 | 9/1995 | Menovcik et al. | 428/480 |
| 5,474,811 | 12/1995 | Rehfuss et al. | 525/456 |
| 5,508,379 | 4/1996 | Menovcik et al. | 528/288 |
| 5,512,639 | 4/1996 | Rehfuss et al. | 427/409 |
| 5,532,061 | 7/1996 | Menovcik et al. | 528/367 |
| 5,552,497 | 9/1996 | Taylor et al. | 525/456 |

OTHER PUBLICATIONS

International Publication No. WO 87/00851 Feb. 12, 1987.
International Publication No. WO 94/10211 May 11, 1994.
International Application No. WO 94/10212 May 11, 1994.
International Application No. WO 94/10213 May 11, 1994.

*Primary Examiner*—Rachel Gorr
*Attorney, Agent, or Firm*—Anne Gerry Sabourin

[57] ABSTRACT

Disclosed is a curable coating composition that includes a compound having both hydroxy functionality and carbamate functionality of the structure

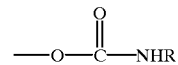

wherein R is H or alkyl, a polyisocyanate crosslinking agents and an aminoplast crosslinking agent. The effective equivalents of the aminoplast crosslinking agent is equal to or less than the equivalents of carbamate functionality and the effective equivalents of polyisocyanate crosslinker is equal to or less than the equivalents of hydroxyl functionality. The carbamate-functional resin and the aminoplast crosslinking agent provide rheology control during the early part of the bake to cure an applied coating of the coating composition.

18 Claims, No Drawings

HIGH SOLIDS THERMOSETTING COMPOSITIONS WITH DUAL CURE MECHANISM

FIELD OF THE INVENTION

The present invention relates to thermoset coating compositions and particularly to the use of carbamate-functional compounds with aminoplast crosslinking agents to provide rheology control and environmental etch resistance in systems curing also through crosslinking of hydroxyl groups with polyisocyanate crosslinkers

BACKGROUND OF THE INVENTION

Basecoat-clearcoat coatings, or color-plus-clear composite coatings, are widely used, especially in the automotive industry, because of their exceptional appearance. Automotive coatings must not only have the desirable appearance properties of high gloss, depth of color, distinctiveness of image, and so on; but they must also be resistant to marring, scratching, etching, or spotting from environmental depositions, chalking, and other forms of film degradation. It is particularly critical in a color-plus-clear composite coating to have a clear coat layer that is resistant to film degradation.

In addition to the considerations of appearance and durability, a coating must be formulated to minimize the amount of regulated volatile organic compound emissions from the painting process. For a thermoset solventborne system this is usually accomplished by employing low molecular weight resins and crosslinking agents. One drawback to this approach is that such coatings systems have poorer rheological properties during application and the curing bake. When the coatings are heated in order to cause a reaction between the resins and crosslinking agents, the viscosity of the low molecular weight resins is reduced. These resins tend to flow on the coated substrate causing sagging, slumping, so-called fat edges, and other appearance problems before the coating has achieved a sufficient level of cure to prevent further movement.

Difficulties with controlling rheology have been a problem particularly with coatings compositions that are cured using blocked polyisocyanates as crosslinkers. Although coatings compositions using polyisocyanate crosslinkers are highly preferred for the excellent appearance and durability of the films they produce, such systems must usually be heated to temperatures of 290° F. (143° C.) and higher in order to de-block the polyisocyanate and thereby initiate cure. At these temperatures, the tendency of the low molecular weight principal resins to flow is increased. Thus, the coating composition flows more than is desirable before there is sufficient crosslinking to set up the coating film. The excessive flow leads to the appearance problems in the cured coating mentioned above.

In U.S. Pat. No. 5,342,888, Sudo describes the cure of hydroxyl-functional acrylic resins with a combination of blocked aliphatic polyisocyanates and alkyl-etherified melamine resins. According to Sudo, coatings from acrylic resins cured only with the alkyl-etherified melamine resin have poor resistance to acid rain deterioration, while such coatings cured only blocked polyisocyanates have good acid resistance but poor low-temperature cure and workability. Sudo teaches that the proportion of melamine resin to the blocked polyisocyanate must be from 50/50 to 95/5 by weight to avoid, on the one hand, inadequate cure and, on the other hand, poor acid resistance However, because the coating compositions of Sudo form coatings that still have a substantial amount of ether linkages from the aminoplast-hydroxy cure, such coatings will show significant deterioration from acid rain etching.

U.S. Pat. No. 4,102,847, Hartmann et al., and U.S. Pat. No. 4,892,906, Pham et al., disclose coating compositions similar to that of Sudo. Both the Hartmann and the Pham references teach hydroxy-functional resins cured with mixtures of melamine and isocyanate. Again, the coating compositions of these references form coatings with a substantial amount of ether linkages and thus will show significant deterioration from acid rain etching.

Carbamate-functional reactive diluents are described in WO 87/00851, Hoy et al.; U.S. Pat. No. 5,115,015, Richey, Jr., et al.; U.S. Pat. No. 4,814,382, Hoy et al.; U.S. Pat. No. 4,677,168, Hoy et al.; and U.S. Pat. No. 4,520,167, Blank et al. The carbamate-functional reactive diluents are low molecular weight compounds with one carbamate group. These materials are mono-functional in the systems disclosed and therefore cannot build up viscosity fast enough at the beginning of the cure cycle to prevent the sagging and other flow problems mentioned above.

SUMMARY OF THE INVENTION

A novel dual-curing system has now been discovered that can be used to resolve the problem of excessive flow during initial stages of thermal curing. The dual-curing system of the invention comprises either (a) a compound having both hydroxyl and carbamate functionality or (b) a combination of a first compound having hydroxyl functionality and a second compound having carbamate functionality, the compound of (a) or compounds of (b) being combined with at least one polyisocyanate crosslinker and at least one aminoplast crosslinker. Preferably, the amount of aminoplast crosslinker is limited so that the aminoplast crosslinker reacts only with the available carbamate groups. The aminoplast functional groups react first with available carbamate functionality before any substantial reaction with hydroxyl groups. It is possible in this way to have the benefit of the faster reaction between aminoplast crosslinkers and carbamate groups while avoiding formation of undesirable ether linkages in the cured coating that would result from reaction of residual functionality of the aminoplast crosslinker with hydroxyl groups.

The coatings formed from the compositions of the invention thus preferably have all urethane linkages. The amount of melamine necessary to react with the carbamate functionality present is also preferably low enough so that melamine self-condensation is avoided. The compositions of the invention provide good rheology control due to the relatively fast reaction of the melamine with carbamate under the curing conditions. An added benefit from the presence of some melamine is a higher solids composition as compared to a system using all isocyanate crosslinker.

DETAILED DESCRIPTION

The present invention provides a curable coating composition that includes a crosslinkable component and a crosslinker or curing agent component. The crosslinkable component includes a compound having both hydroxyl and carbamate functionality or a combination of a first compound having hydroxyl functionality and a second compound having carbamate functionality. The crosslinker component includes at least one polyisocyanate crosslinker and at least one aminoplast crosslinker.

Carbamate groups according to the present invention can generally be characterized by the formula

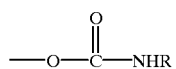

wherein R is H or alkyl, preferably of 1 to 4 carbon atoms. More preferably, D is H or methyl, and even more preferably R is H.

Preferably, the curable compositions of the invention include as the crosslinkable component either (1) a resin or polymer having both hydroxyl and carbamate functionality or a combination of such resins or polymers; or (2) a combination of one or more first compounds that are resins or polymers having a plurality of hydroxyl groups and one or more second compounds having a plurality of functional groups, at least one of which is a carbamate functional group. The second compound may be a simple monomeric compound having either (1) at least two carbamate groups or (2) at least one carbamate group and at least one hydroxyl group. Alternatively, the second compound may be may be a resin or polymer having a plurality of functional groups, at least one of which is a carbamate functional group. In yet another embodiment of the invention, a combination of two or more of such monomeric second compounds and resinous or polymeric second compounds may be employed.

The crosslinker component includes at least one polyisocyanate crosslinker and at least one aminoplast crosslinker. The effective equivalents of the aminoplast crosslinking agent is equal to or less than the equivalents of carbamate functionality in the curable coating composition. Preferably, the ratio of effective equivalents of the aminoplast crosslinking agent to equivalents of carbamate functionality is at least about 0.6:1, more preferably at least about 0.8:1, and particularly preferably about 1:1. The effective equivalents of the polyisocyanate crosslinking agent is preferably equal to or less than the equivalents of hydroxyl functionality in the crosslinkable component. More preferably, the ratio of effective equivalents of the polyisocyanate crosslinking agent to equivalents of hydroxyl functionality is up to about 1:1, and even more preferably up to about 0.9:1. The ratio of effective equivalents of the polyisocyanate crosslinking agent to equivalents of hydroxyl functionality is also more preferably at least about 0.5:1, and even more preferably at least about 0.6:1. In a particularly preferred embodiment, the ratio of effective equivalents of the polyisocyanate crosslinking agent to equivalents of hydroxyl functionality is about 0.7:1.

The phrase "effective equivalents" as used in connection with this invention means equivalents based upon the number of functional groups that can be expected to actually react out of all available functional groups. The number of functional groups of an aminoplast crosslinking agent that can be expected to react is often less than the number of groups theoretically available of reaction due to steric hinderance from crosslinks already formed, different conditions required for reaction of the remaining groups, or other such factors with which a person of skill in the art would be familiar. It is well-known in the art, for example, that the effective number of functional groups of hexamethoxymethyl melamine that will form crosslinks is less than the theoretical six. The extent of reaction of the various groups and the types of bonds formed can be determined by traditional methods such as, in particular, Fourier Transform Infrared (FTIR) spectroscopy.

The first compound or compounds that are resins or polymers having a plurality of hydroxyl groups may be selected from many type of resins or polymers known to the art to be useful in curable coating compositions, including polyesters, polyurethanes, polyethers, and addition polymers such as acrylic resins and polymers.

Non-limiting examples of suitable polyester polymers are those prepared from polyacids (compounds with two or more carboxylic acid groups), or anhydrides of such acids, and polyols (compounds with two or more alcohol groups). Preferably, an excess of equivalents of the polyol is used so that the polyester has terminal hydroxyl groups. Alternatively, if an excess of equivalents of acid functionality is used so that an acid-terminated polyester is formed, the acid groups can be reacted with a compound that has one or more hydroxyl groups and one or more groups reactive with acid groups, such as a polyol, aminoalcohol, and the like.

Non-limiting examples of such polyacids or anhydrides of polyacids include, without limitation, phthalic acid, terephthalic acid, isophthalic acid, adipic acid, succinic acid, fumaric acid, maleic acid, azeleic acid, sebacic acid, dimer fatty acid, benzenetricarboxylic acids, hexahydrophthalic acid, methyl hexahydrophthalic acid, glutamic acid, and anhydrides of these acids. Other acids that may be included are the acids having between 12 and 36 carbon atoms in the alkyl portion of the molecule, with the dimer fatty acids being particularly preferred. Suitable polyols include, without limitation, 1,4-butanediol, 1,3-butanediol, 2,3-butanediol, 1,2,4-butanetriol, 1,6-hexanediol, 1,2,6-hexanetriol, neopentyl glycol, ethylene glycol, propylene glycol, dipentaerythritol, tripentaerythritol, diethylene glycol, triethylene glycol, tetraethylene glycol, dipropylene glycol, butylene glycol, glycerol, triethylolpropane, trimethylolpropane, cyclohexanedimethanols, 2-methyl-2-ethyl-1,3-propanediol, 2-ethyl-1,3-hexanediol, 1,5-pentanediol, thiodiglycol, 1,3-propanediol, 2,2,4-trimethyl-1,3-pentanediol, cyclohexanediols, polyethylene glycols, polypropylene glycols, pentaerythritol, mannitol, sorbitol, and mixtures of such alcohols. Compounds having both acid and alcohol groups may be included, non-limiting examples of such compounds being dimethylolpropionic acid, ricinoleic acid, hydroxy acids such as 12-hydroxystearic acid, and so on. Other components of polyesters can include, without limitation, lactones such as ε-caprolactone and δ-butyrolactone. The polyol may include fluorine groups or silane groups Non-limiting examples of these include 2,2,3,3,4,4-hexafluoro-1,5-pentanediol and perfluoroazelaic acid.

A polyurethane having at least two hydroxyl groups can be formed by reacting a polyol, preferably a diol, with a polyisocyanate, preferably a diisocyanate. The polyisocyanate can be an aliphatic polyisocyanate, including a cycloaliphatic polyisocyanate, or an aromatic polyisocyanate. The term "polyisocyanate" as used herein refers to any compound having a plurality of isocyanate functional groups on average per molecules. Polyisocyanates encompass, for example, monomeric polyisocyanates including monomeric diisocyanates, biurets and isocyanurates of monomeric polyisocyanates, extended poly-functional isocyanantes formed by reacting one mole of a diol with two moles of a diisocyanate or mole of a triol with three moles of a diisocyanate, and the like. Aliphatic polyisocyanates are preferred when the coating composition is an automotive topcoat composition. Useful examples include, without limitation, ethylene diisocyanate, 1,2-diisocyanatopropane, 1,3-diisocyanatopropane, 1,4-butylene diisocyanate, lysine diisocyanate, 1,4-methylene bis (cyclohexyl isocyanate), isophorone diisocyanate, toluene diisocyanate, the isocyanurate of toluene diisocyanate, diphenylmethane 4,4'- diisocyanate, the isocyanurate of diphenylmethane 4,4'-diisocyanate, methylenebis-4, 4'-isocyanatocyclohexane, isophorone diisocyanate, the isocyanurate of isophorone diisocyanate, 1, 6-hexamethylene diisocyanate, the isocyanurate of 1,6-hexamethylene diisocyanate, 1,4-cyclohexane diisocyanate, p-phenylene diisocyanate, triphenylmethane 4,4',4"-triisocyanate, tetramethyl xylene diisocyanate, and metaxylene diisocyanate.

The polyol can be the same as the polyols described above for the preparation of polyesters. In a preferred embodiment, at least one oligomeric or polymeric polyol is used to prepare the polyurethane. Non-limiting examples of oligomeric or polymeric polyols are polyester polyols and polyether polyols.

Two general synthetic approaches may be utilized to prepare the polyurethane resin. A polyurethane having terminal hydroxy functionality can be obtained by reacting a diisocyanate and a diol in an OH:NCO equivalent ratio of greater than 1:1. In this case, the polyurethane resin formed will have terminal hydroxyl groups as a result of the equivalent excess of the polyol. Alternatively, the polyurethane may be formed by reacting polyisocyanate and polyol in an OH:NCO ratio of less than 1:1, thus forming a polyurethane having terminal isocyanate functionality, and then reacting the terminal isocyanate groups in a second step, sometimes called a capping step, with a compound having at least one group reactive with isocyanate functionality, which may be, for example, a hydroxyl group or a primary or secondary amine group, and at least one (or at least one additional) hydroxyl group or at least one group that can be converted into a hydroxyl group. Suitable capping agents include, without limitation, aminoalcohols such as ethanolamine and diethanolamine, solketal, diols such as neopentyl glycol, triols such as trimethylolpropane, and mixture of these. This method is useful for providing a plurality of hydroxyl groups at each end of the polymer.

Non-limiting examples of polyether polyols are polyalkylene ether polyols that include poly(oxytetraethylene) glycols, poly(oxy-1,2-propylene) glycols and poly(oxy-1,2-butylene) glycols. Also useful are polyether polyols formed from oxyalkylation of various polyols, for example, glycols such as ethylene glycol, 1,6-hexanediol, Bisphenol A and the like, or other higher polyols, such as trimethylolpropane, pentaerythritol and the like. Useful polyols of higher functionality can be made, for instance, by oxyalkylation of compounds such as sorbitol or sucrose. One commonly utilized oxyalkylation method is to react a polyol with an alkylene oxide, for example, ethylene or propylene oxide, in the presence of an acidic or basic catalyst.

The resin having at least two hydroxyl groups may also be an addition polymer having hydroxyl groups. Such a polymer may be synthesized, for example, by including in the addition reaction an unsaturated monomer having one or more hydroxyl groups. Acrylic resins synthesized with one or more hydroxy-functional ethylenically unsaturated monomers are preferred. The hydroxy-functional ethylenically unsaturated monomer is preferably an alkyl ester of acrylic or methacrylic acid. (In the context of describing the present invention, the term "(meth)acrylate" will be used to indicate that both the methacrylate and acrylate esters are included.) Preferred hydroxyl-functional monomers include hydroxyethyl (meth)acrylate, hydroxypropyl (meth)acrylates, hydroxybutyl (meth)acrylates, hydroxyhexyl (meth)acrylates, other hydroxyalkyl (meth)acrylates having branched or linear alkyl groups of up to about 10 carbons, and mixtures of these. Caprolactone esters of these hydroxyl-functional monomers are also included among preferred compounds. Alternatively, caprolactone can be reacted with the hydroxyl group of the addition polymer after the polymerization reaction according to known methods. Particularly preferred as the hydroxy-functional ethylenically unsaturated monomer are hydroxyethyl (meth)acrylate, hydroxypropyl (meth)acrylates, and mixtures of these. The person skilled in the art will appreciate that hydroxyl groups can be generated by other means, such as, for example, the ring opening of a glycidyl group, for example from glycidyl methacrylate, by an organic acid or an amine.

The unsaturated monomer having at least one hydroxyl group is polymerized along with other unsaturated copolymerizable monomers known in the art. Such copolymerizable monomers include, without limitation, $\alpha,\beta$-ethylenically unsaturated monocarboxylic acids, particularly those containing 3 to 5 carbon atoms, and the esters, nitriles, or amides of these acids; $\alpha$, $\beta$-ethylenically unsaturated dicarboxylic acids containing 4 to 6 carbon atoms and the anhydrides, monoesters, and diesters of those acids; vinyl esters, vinyl ethers, vinyl ketones, vinyl amides, and aromatic or heterocyclic aliphatic vinyl compounds.

Representative examples of esters of acrylic, methacrylic, and crotonic acids include, without limitation, those from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates and methacrylates; and polyalkylene glycol acrylates and methacrylates.

Other functional monomers that may be included in the polymerization of addition polymers, particularly acrylic resins, include, without limitation, acrylates or methacrylates having isocyanato, amino, amido, or glycidyl groups, such as glycidyl esters of unsaturated esters and glycidyl ethers of unsaturated alcohols such as glycidyl (meth) acrylate and allyl glycidyl ether; N,N-dimethylaminoethyl (meth)acrylate and t-butylaminoethyl (meth)acrylate; acrylamide, methacrylamide, and related compounds; isocyanatoethyl (meth)acrylate, vinyl isocyanate, isopropenyl isocyanate, and meta-isopropenyl-$\alpha,\alpha$-dimethylbenzyl isocyanate. Meta-isopropenyl-$\alpha,\alpha$-dimethylbenzyl isocyanate is available fro American Cyanamid Company, Wayne, N.J. under the tradename "TMI(Meta) unsaturated aliphatic isocyanate."

Representative examples of other ethylenically unsaturated polymerizable monomers include, without limitation, such compounds as fumaric, maleic, succinic, tetrahydrophthalic, chlorendic, citraconic, and itaconic anhydrides and esters, (meth)acrylic acid amides; and (meth)acrylonitriles. Representative examples of polymerization vinyl monomers include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, $\alpha$-methyl styrene, vinyl toluene, t-butyl styrene, and 2-vinyl pyrrolidone.

Other suitable addition polymers include, without limitation, polyalkylene homopolymers, polyalkylene copolymers or polyalkylene block copolymers. Such compounds are polymerized from olefins selected from the group consisting of ethylene, propylene, butylene, and mixtures thereof. An example is an ethylene/butylene copolymer having terminal hydroxy functionality, available commercially from Shell Chemical Company, Houston Tex., and sold under the trademark Kraton®.

The addition copolymers are preferably acrylic polymers. For purposes of this invention, acrylic polymers are defined as polymers that include one or more α,β-ethylenically unsaturated monocarboxylic acids containing 3 to 5 carbon atoms or derivatives of those acids, such as the esters or other derivatives named above. The preferred acrylic polymers may be prepared by using conventional techniques, such as free radical polymerization, cationic polymerization, or anionic polymerization, in, for example, a batch or semi-batch process. For instance, the polymerization may be carried out by heating the ethylenically unsaturated monomers in bulk or in organic solution or aqueous dispersion in the presence of a free radical source, such as an organic peroxide or azo compound and, optionally, a chain transfer agent for a batch process; or, alternatively, the monomers, initiator(s), and any chain transfer agent may be fed at a controlled rate into a heated reactor charged with solvent in a semi-batch process.

Typical free radical sources are organic peroxides, including dialkyl peroxides, such as di-tert-butyl peroxide and dicumyl peroxide, peroxyesters, such as tert-butyl peroxy 2-ethylhexanoate and tert-butyl peroxy pivalate; peroxydicarbonates, such as di-2-ethylhexyl peroxydicarbonate and dicyclohexyl peroxydicarbonate; diacyl peroxides, such as dibenzoyl peroxide and dilauroyl peroxide; hydroperoxides, such as cumene hydroperoxide and tert-butyl hydroperoxide; ketone peroxides, such as cyclohexanone peroxide and methylisobutyl ketone peroxide; and peroxyketals, such as 1,1-bis(tert-butyl peroxy)-3,5,5-trimethylcyclohexane and 1,1-bis(tert-butyl peroxy) cyclohexane; as well as azo compounds such as 2,2'-azobis(2-methylbutanenitrile) and 1,1'-azobis (cyclohexanecarbonitrile). Typical chain transfer agents are mercaptans such as octyl mercaptan, n- or tert-dodecyl mercaptan, thiosalicylic acid, mercaptoacetic acid, and mercaptoethanol; halogenated compounds; and dimeric alphamethyl styrene.

The free radical polymerization is usually carried out at temperatures from about 20° C. to about 200° C., preferably from 90° C. to 170° C. The reaction may conveniently be done at reflux, although reflux is not required. The initiator should be chosen so its half-life at the reaction temperature is preferably no more than thirty minutes.

Preferred acrylic polymers generally have a number average molecular weight of from about 1000 to about 40,000, preferably from about 1000 to about 6000, and even more preferably from about 1000 to about 3000. The molecular weight can be determined by gel permeation chromatography using a polystyrene standard. The glass transition temperature can be adjusted according to methods well-known in the art through selection and apportionment of the comonomers. In a preferred embodiment, the $T_g$ of the acrylic polymer or resin is between about −20° C. and about +80° C.; more preferably the $T_g$ of the acrylic polymer or resin is at least about +10° C., and also more preferably the $T_g$ of the acrylic is up to about +50° C.

The curable compositions of the invention include at least one material that has carbamate functionality. As described above, when the compositions include one or more of the first compounds that are resins or polymers having a plurality of hydroxyl groups, then at least one second compound having a plurality of functional groups, at least one of which is a carbamate functional group, is also included. The second compound may have a plurality of carbamate groups or may have at least one carbamate group and at least one hydroxyl group. In the alternative, the composition may include a resin or polymer having both hydroxyl and carbamate functionality in place of the combination of the first compound with hydroxyl functionality and the second compound with carbamate functionality. These carbamate-functional materials will be described together.

The compound having carbamate functionality or both hydroxyl and carbamate functionality may be a simple monomeric compound, such as hydroxyethyl carbamate or the adduct of a hydroxyalkyl carbamate and a polyisocyanate, or may be a resin, oligomer, or polymer, such as an epoxy resin, polyester, polyurethane, or an acrylic polymer. Oligomers and polymers are preferred for outdoor durability, although monomeric compounds provide the rheology control, also.

Compounds that are resins or polymers having carbamate functionality or both hydroxyl and carbamate functionality can be prepared by two basic methods. In a first method, the compound is produced by polymerization of a mixture that includes one or more carbamate-functional reactive monomers. For a compound with both hydroxyl and carbamate functionality, the mixture may further include one or more hydroxyl-functional reactive monomers. In a second method, a polymer is formed that has a group that can be converted to a carbamate group in a first step, followed by a second step of conversion of that group to the carbamate functionality to produce the compound of the invention. For a compound with both hydroxyl and carbamate functionality, the polymer or resin may have hydroxyl groups in addition to the group that can be converted to a carbamate group. In the case in which hydroxyl functionality is used as the group that can be converted to a carbamate group, conversion to carbamate of less than all of the hydroxyl on a molecule will result in a compound with both hydroxyl and carbamate functionality.

According to the first method, the compound is produced by polymerization of a mixture that includes one or more carbamate-functional reactive monomers. In the case of an acrylic polymer, an ethylenically unsaturated monomer carrying the carbamate functionality in its ester portion may be polymerized or copolymerized to produce the acrylic polymer with carbamate functionality. Such monomers are known in the art and are described, for example, in U.S. Pat. Nos. 3,479,328, 3,674,838, 4,126,747, 4,279,833, 4,340,497, and 5,412,049, all of which are incorporated herein by reference. Particularly preferred ethylenically unsaturated monomers with carbamate functionality are 2-hydroxyethyl carbamate (meth)acrylate, 2-hydroxypropyl carbamate (meth)acrylate, 2-hydroxybutyl carbamate (meth)acrylate, N-methyl-2-hydroxyethyl carbamate (meth)acrylate, N-ethyl-2-hydroxyethyl carbamate (meth)acrylate, N-propyl-2-hydroxyethyl carbamate (meth)acrylate, N-butyl-2-hydroxyethyl carbamate (meth)acrylate, N-methyl-2-hydroxypropyl carbamate (meth)acrylate, N-ethyl-2-hydroxypropyl carbamate (meth)acrylate, N-propyl-2-hydroxypropyl carbamate (meth)acrylate, N-butyl-2-hydroxypropyl carbamate (meth)acrylate.

These and other carbamate-functional monomers can be prepared by known methods, and polymerized, along with other ethylenically-unsaturated monomers such as those mentioned above in conjunction with the hydroxyl-functional polymers, using techniques well-known in the art. By way of example, one method of synthesizing an α,β-ethylenically unsaturated monomer involves reaction of a hydroxy ester with urea to form the carbamyloxy carboxylate. Another method of forming the carbamyloxy carboxylate is by reaction of an α,β-unsaturated acid or anhydride with a hydroxy carbamate ester. A hydroxyalkyl carbamate can be made by reacting a primary or secondary amine or diamine with a cyclic carbonate, such as ethylene carbonate or propylene carbonate, followed by esterification of the hydroxyl group with acrylic or methacrylic acid to form the monomer. Preferred acrylics are those described in U.S. Pat. No. 5,474,811, incorporated herein by reference.

According to the second method, a polymer is formed that has a group that can be converted to a carbamate group in a first step, followed by a second step of conversion of that group to the carbamate functionality to produce the compound of the invention. Groups that can be converted to carbamate include cyclic carbonate groups, epoxy groups, and unsaturated bonds. Cyclic carbonate groups can be converted to carbamate groups by reaction with ammonia or a primary amine, which ring-opens the cyclic carbonate to form a β-hydroxy carbamate. Epoxy groups can be converted to carbamate groups by first converting to a cyclic carbonate group by reaction with $CO_2$. This can be done at any pressure from atmospheric up to supercritical $CO_2$ pressures, but is preferably under elevated pressure (e.g., 60–150 psi). The temperature for this reaction is preferably 60–150° C. Useful catalysts include any that activate an epoxide ring, such as tertiary amine or quaternary salts (e.g., tetramethyl ammonium bromide), combinations of complex organotin halides and alkyl phosphonium halides (e.g., $(CH_3)_3SnI$, $Bu_4SnI$, $Bu_4PI$, and $(CH_3)_4PI$), potassium salts (e.g., $K_2CO3$, KI) preferably in combination with crown ethers, tin octoate, calcium octoate, and the like. The cyclic carbonate group can then be converted to a carbamate group as described above. Any unsaturated bond can be converted to carbamate groups by first reacting with peroxide to convert to an epoxy group, then with $CO_2$ to form a cyclic carbonate, and then with ammonia or a primary amine to form the carbamate.

Other groups, such as hydroxyl groups or isocyanate groups, can also be converted to carbamate groups. Hydroxyl groups can be converted to carbamate groups by reaction with cyanic acid (which may be formed in situ by thermal decomposition of urea) to form the primary carbamate group (i.e., unsubstituted carbamate) of the invention. This reaction preferably occurs in the presence of a catalyst as is known in the art. A hydroxyl group can also be reacted with phosgene and then ammonia to form a primary carbamate group. Another approach is to react an isocyanate with a compound such as hydroxyalkyl carbamate to form a carbamate-capped isocyanate derivative. For example, one isocyanate group on toluene diisocyanate can be reacted with hydroxypropyl carbamate, followed by reaction of the other isocyanate group with an excess of polyol to form a hydroxy carbamate. Finally, carbamates can be prepared by a transesterification approach in which the hydroxyl group is reacted with an alkyl carbamate (e.g., methyl carbamate, ethyl carbamate, butyl carbamate) to form a carbamate group-containing compound. This reaction is performed under heat, preferably in the presence of a catalyst such as an organometallic catalyst (e.g., dibutyltin dilaurate). Carbamate compounds having lower alkyl groups give faster transesterification. The esterification is catalyzed by Lewis acids, such as tin or titanate catalysts. Examples of useful catalysts include, without limitation, dibutyltin dilaurate, dibutyltin oxide, and isobutoxy titanate, The reaction is also catalyzed by Bronsted acids, such as para-toluene sulfonic acid. A methylol acrylamide can be reacted with the hydroxyl group on a compound and then converted to carbamate. In this reaction, the unsaturated bond is then reacted with peroxide, $CO_2$, and ammonia as described above. Other techniques for preparing carbamates are also known in the art and are described, for example, in P. Adams & F. Baron, "Esters of Carbamic Acid", *Chemical Review*, v. 65, 1965.

Another technique involves reacting the hydroxyl groups of a hydroxyalkyl carbamate, such as hydroxypropyl carbamate, with isocyanate groups on the polymer. Isocyanate-functional acrylics are known in the art and are described, for example, in U.S. Pat. No. 4,301,257, incorporated herein by reference. Suitable examples of isocyanate vinyl monomers are listed above.

Useful carbamate-functional polyurethanes are disclosed by Rehfuss et al., U.S. Pat. No. 5,373,069 (issued Dec. 13, 1994), incorporated herein by reference.

Useful carbamate-functional acrylic polymers are disclosed by Taylor et al., U.S. Pat. No. 5,552,497 (issued Sep. 3, 1996), and in U.S. Patent No. 4,758,632, both of which are incorporated herein by reference. The '497 patent describe acrylic polymers produced by polymerization with a carbamate-functional monomer, while the '632 patent describes reacting a polymer such as an acrylic polymer with another component to form a carbamate-functional group appended to the polymer backbone.

Useful carbamate-functional polyesters are disclosed by Menovcik et al., U.S. Pat. Nos. 5,451,656 (issued Sep. 19, 1995), 5,508,379 (issued Apr. 16, 1996), and 5,532,061 (issued Jul. 2, 1996), each of which is incorporated herein by reference.

The carbamate-functional resin has at least two carbamate groups per molecule, and preferably it has an equivalent weight of less than about 700 g/eq carbamate functionality. In principle, any of the above methods may be used to convert functional groups on monomeric compounds to carbamate groups to produce monomeric compounds having a plurality of carbamate groups or at least one carbamate group and at least one hydroxyl group.

Other useful monomeric compounds include hydroxyalkyl carbamates, compounds having a carbamate group and a hydroxyl-terminated segment formed by reaction of a lactone or a hydroxy carboxylic acid with an active hydrogen group (e.g., hydroxy or amine) on the compound, and materials derived from monomeric isocyanate compounds such as those disclosed in Rehfuss et al., U.S. Pat. No. 5,512,639 (issued Apr. 30, 1996), incorporated herein by reference. Hydroxyalkyl carbamates are compounds that include a general structure

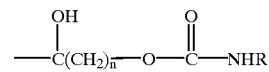

in which n represents an integer for from 0 to about 6, preferably 1, and R is E or alkyl, preferably of 1 to 4 carbon atoms. More preferably, R is H or methyl, and even more preferably, R is H. Preferred hydroxyalkyl carbamates include hydroxyethyl carbamate and hydroxypropyl carbamate.

Hydroxyalkyl carbamates may be prepared from hydroxyalkyl cyclic carbonates. Certain hydroxyalkyl cyclic carbonates like 3-hydroxypropyl carbonate (i.e., glycerine carbonate) are commercially available. Cyclic carbonate compounds can be synthesized by one of several approaches described above. One approach involves reacting an epoxy group-containing compound with $CO_2$. Epoxides can also be reacted with β-butyrolactone in the presence of such catalysts. In another approach, a glycol like glycerine is reacted at temperatures of at least 80° C. with diethyl carbonate in the presence of a catalyst (e.g., potassium carbonate) to form a hydroxyalkyl carbonate. Alternatively, a functional compound containing a ketal of a 1,2-diol having the structure:

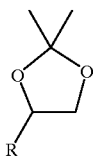

can be ring-opened with water, preferably with a trace amount of acid, to form a 1,2-glycol, which is then further reacted with diethyl carbonate to form the cyclic carbonate.

Cyclic carbonates typically have 5–6-member rings, as is known in the art. Five-member rings are preferred, due to their ease of synthesis and greater degree of commercial availability. Six-member rings can be synthesized by reacting phosgene with 1,3-propane diol under conditions known in the art for the formation of cyclic carbonates. Preferred hydroxyalkyl cyclic carbonates used in the practice can be represented by the formula:

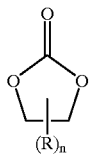

in which R (or each instance of R if n is more than 1) is a hydroxyalkyl group of 1–18 carbon atoms, preferably 1–6 carbon atoms, and more preferably 1–3 carbon atoms, which may be linear or branched and may have substituents in addition to the hydroxyl (which itself may be primary, secondary, or tertiary), and n is 1 or 2, which may be substituted by one or more other substituents such as blocked amines or unsaturated groups. More preferably, R is $-C_mH_{2m}OH$ where the hydroxyl may be primary or secondary and m is 1 to 8, and even more preferably, R is $-(CH_2)_p-OH$ where the hydroxyl is primary and p is 1 to 2.

Amino carbamates are described in U.S. Pat. No. 2,842,523, incorporated herein by reference.

In one preferred embodiment, the carbamate-functional resin is the adduct of a hydroxyalkyl carbamate and the isocyanurate of isophorone diisocyanate. Adducts of hydroxyethyl carbamate, hydroxypropyl carbamate, or combinations of these with aliphatic polyisocyanates such as those mentioned above are particularly preferred.

In yet another embodiment of the invention, carbamate functional resin or polymer is formed by reacting the cyclic carbonate group on a cyclic carbonate-functional polymer with ammonia. Cyclic carbonate-functional acrylic polymers are known in the art and are described, for example, in U.S. Pat. No. 2,979,514, incorporated herein by reference. Carbonate functionality may be synthesized by reacting an epoxide group with carbon dioxide according to known methods, such as those described above.

The compositions of the present invention further include one or more aminoplast resins. Methylol or methylalkoxy groups of the aminoplast resins react preferentially with the carbamate groups of the carbamate-functional compounds, as opposed to the hydroxyl functionality of the composition, at the curing temperatures contemplated by the invention. After all of the carbamate functionality has been reacted, excess equivalents of aminoplast resin, if any, may further react with the hydroxyl groups of the principal resin. However, this further reaction is not preferred when it produces ether linkages in the cured film. For this reason, it is preferred that there is essentially no reaction between the aminoplast curing agent and the hydroxyl functionality.

The reaction between aminoplast resin and carbamate-functional compound serves to control the rheology of the coating composition during the initial stage of the bake. Without the aminoplast-carbamate reaction, the viscosity of the coating composition becomes too low as it is heated to the curing temperature and before the isocyanate-hydroxyl reaction progresses to an appreciable extent. The faster reaction between aminoplast resin and carbamate-functional compound is therefore key to preventing unwanted coating defects due to excessive flow during the baking cycle, such as sagging, slumping, fat edges, orange peel, and so on.

Suitable aminoplast resins are amine/aldehyde condensates, preferably at least partially etherified, and most preferably fully etherified. Melamine and urea are preferred amines, but other triazines, triazoles, diazines, guanidines, or guanamines may also be used to prepare the alkylated amine/aldehyde aminoplast resins crosslinking agents. The aminoplast resins are preferably amine/formaldehyde condensates, although other aldehydes, such as acetaldehyde, crotonaldehyde, and benzaldehyde, may be used. Non-limiting examples of preferred aminoplast resins include monomeric or polymeric melamine formaldehyde resins, including melamine resins that are partially or fully alkylated using alcohols that preferably have one to six, more preferably one to four, carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like. Monomeric melamine formaldehyde resins are particularly preferred. The preferred alkylated melamine formaldehyde resins are commercially available, for example from Monsanto Corp., St. Louis, Mo., under the trademark RESIMENE or from Cytec Industries, Stamford, Conn., under the trademark CYMEL.

The polyisocyanate crosslinking agent is preferably an aliphatic, including a cycloaliphatic, polyisocyanate. Aliphatic polyisocyanates are preferred because of the better color and resistance to UV degradation of aliphatic polyisocyanates as compared to aromatic polyisocyanates. Illustrative polyisocyanate crosslinkers include, without limitation, aliphatic diisocyanates such as 1,2-diisocyanatopropane, 1,3-diisocyanatopropane, 1,2-butylene diisocyanate, 1,3-butylene diisocyanate, 1,4-butylene diisocyanate, 2,3-butylene diisocyanate, lysine diisocyanate, 4,4'-methylenebis(cyclohexyl isocyanate), isophorone diisocyanate, diisocyanatocyclohexane, pentamethylene diisocyanate, hexamethylene diisocyanate, 2,2,4- and 2,4,4-trimethylhexamethylene diisocyanate, and biurets, allophanates, and isocyanurates of these. Especially preferred are the isocyanurates of hexamethylene diisocyanate and of isophorone diisocyanate and mixtures of these isocyanates. Commercial polyisocyanates are available, for example from Bayer, Pittsburgh, Pa., and Hüls, Piscataway, N.J.

It is also useful to react excess diisocyanate with polyol to form a polyisocyanate crosslinker. Preferably, the polyisocyanate product of this reaction is monomeric. For example, useful crosslinking agents can be made by reacting two equivalents of a diisocyanate such as hexamethylene diisocyanate with one equivalent of a polyol such as ethylene glycol, propylene glycol, 1,4-butanediol, 1,6-hexanediol, neopentyl glycol, trimethylpentanediol, cyclohexanedimethanol, glycerol, trimethylolpropane, trimethylolethane, pentaerythritol, or mixtures of these. The reaction between polyisocyanate and polyol may be carried out neat or in solution, and may optionally use a catalyst, such as the organotin catalysts dibutyltin dilaurate and dibutyltin diacetate.

The polyisocyanate crosslinking agents are preferably blocked with compounds such as phenols, caprolactam, low molecular weight oximes such as acetone oxime, methyl ethyl ketoxime, cyclohexanone oxime, acetophenone oxime, and so on, that will allow the polyisocyanate crosslinking agent to be formulated into a stable composition. Methyl ethyl ketoxime and acetone oxime are preferred for their low unblocking temperatures.

The compositions may include one or more catalysts, and preferably include at least one catalyst for the aminoplast reaction and at least one catalyst for the isocyanate reaction. Useful catalysts include, without limitation, alkylsulfonic acid, arylsulfonic acids, and alkylaryl sulfonic acids, such as methane sulfonic acid, p-toluene sulfonic acid, and dodecylbenzene sulfonic acid; dinonylnaphthalene disulfonic acids; phosphoric acid and its esters, such as phenyl acid phosphate, hydroxy phosphate ester, and butyl phosphate; boron trifluoride etherate, trimellitic acid, monobutyl maleate, triflic acid; zinc octanoate, stannous octanoate, dibutyltin dilaurate, dibutyltin diacetate, bismuth octoate, and so on. Preferred among these are blocked and unblocked alkyl sulfonic acids and dialkyltin salts.

Although the coating compositions of the present invention may be used as powder coatings, preferably, the coating compositions further include organic solvents. In one highly preferred embodiment, the compositions are solventborne coating compositions. Preferably, the coating compositions are organic solvent solutions. The solvent may be present in an amount of from about 15 percent to about 99 percent by weight, preferably from about 20 percent to about 80 percent by weight, and more preferably from about 20 percent to about 50 percent by weight.

The selection of particular solvents may be made according to methods well-known in the art. The optimum solvent or mixture of solvents may be arrived at by straightforward testing of the particular mixture. In general, useful solvents will include, without limitation, esters, particularly acetates, propionates, and butyrates, alcohols, ketones, aromatic solvents, glycol ethers and esters, aprotic amides, aprotic sulfoxides, and aprotic amines. Non-limiting examples of useful solvents include methyl ethyl ketone, methyl isobutyl ketone, amyl acetate, butyl acetate, ethylene glycol butyl ether, propylene glycol methyl ether acetate, xylene, toluene, isopropanol, butanol, naphtha and other blends of aromatic hydrocarbons, N-methylpyrrolidone, and isobutyl isobutyrate.

Topcoat coating compositions according to the invention may further include pigments such as are commonly used in the art, including color pigments, flake pigments, and filler pigments. Illustrative examples of these are azo reds, quinacridone reds and violets, perylene reds, copper phthalocyanine blues and greens, carbazole violet, monoarylide and diarylide yellows, tolyl and naphthol oranges, metal oxides, chromates, molybdates, phosphates, and silicates, silicas, aluminums, micas, and bronzes. While flake pigments are usually stirred in as a slurry, other pigments are generally dispersed with resins or dispersants and solvent to form pigment pastes, using equipment, such as attritors and sand mills, and methods widely-used in the art.

In a preferred embodiment, the coating compositions of the invention contain no color pigments and are used as clearcoats.

Other conventional materials, such as dyes, flow control agents, wetting agents, slip agents, UV absorbers, HALS compounds, antioxidants, and so on may be added to the compositions.

The coating compositions of the present invention are used as the outermost layer or layers of coating on a coated substrate. The coatings can be applied over many different substrates, including wood, metals, glass, cloth, plastic, foam, metals, and elastomers. They are particularly preferred as topcoats on automotive articles, such as metal bodies or elastomeric fascia.

Preferably, these coating compositions are applied over one or more layers of primer coatings. When the article is a metallic article, it is preferred to have a layer of electrocoat primer and/or primer surfacer. The present coating compositions may be used as a one-coat pigmented topcoat layer, or may be the clear coat of a color-plus-clear composite coating. In a preferred embodiment, the coating composition of the present invention is the clearcoat of a color-plus-composite coating. The clear coat is preferably applied wet-on-wet over a layer of a basecoat composition. Suitable pigmented color coat or basecoat compositions are well-known in the art. Polymers known in the art to be useful in basecoat compositions include, without limitation, acrylics, vinyl, polyurethanes, polycarbonates, polyesters, alkyds, and polysiloxanes. Acrylics and polyurethanes are preferred. Thermoset basecoat compositions are also preferred, and, to that end, preferred basecoat polymers comprise one or more kinds of crosslinkable functional groups, such as hydroxy, isocyanate, amine, epoxy, acrylate, vinyl, silane, acetoacetate, and so on. The basecoat polymer may be self-crosslinking, or, preferably, the composition may include a crosslinking agent. such as a polyisocyanate or an aminoplast resin of the kind described above.

The coating compositions of the invention can be applied to an article to be coated according to any of a number of techniques well-known in the art. These include, for example, spray coating, dip coating, roll coating, curtain coating, and the like. For automotive applications, spray coating is preferred, particularly electrostatic spray methods. Coating layers of a mil or more are usually applied in two or more coats, separated by a time sufficient to allow some of the solvent to evaporate, or "flash," from the applied layer. The flash may be at ambient or elevated temperatures, for example, the flash may use radiant heat. The coats as applied can be from 0.5 mil up to 3 mils dry, and a sufficient number of coats are applied to yield the desired final coating thickness.

Color-plus-clear composites are usually applied wet-on-wet. The compositions are applied in coats separated by a flash, as described above, with a flash also between the last coat of the color composition and the first coat the clear. The two coating layers are then cured simultaneously Preferably, the cured base coat layer is 0.5 to 1.5 mils thick, and the cured clear coat layer is 1 to 3 mils, more preferably 1.6 to 2.2 mils, thick.

The coating compositions described are preferably cured with heat. Curing temperatures are preferably from about 70° C. to about 180° C., and particularly preferably from about 120° C. to about 150° C. Typical curing times at these temperatures range from 15 to 60 minutes, and preferably the temperature is chosen to allow a cure time of from about 15 to about 30 minutes. It is preferred that the amounts of the components of the coating composition are selected so that there is essentially no reaction between the aminoplast crosslinker and the hydroxyl groups of the resin that has the hydroxyl functionality. It is also preferred that the amounts of the components of the coating composition are selected so that the carbamate-functional compound and the aminoplast crosslinking agent are reacted to a sufficient extent during curing to prevent sagging of the coating and other flow-related coating defects. In one preferred embodiment of the invention, the aminoplast crosslinking agent is from at least about 25% by weight of the weight of the total weight of crosslinking agent. Also preferred is a composition in which the aminoplast crosslinking agent is up to about 60% by weight of the total weight of crosslinking agent.

The coating composition is cured to form a coated article. In a preferred embodiment, the coated article is an automotive body or part.

The invention is further described in the following examples. The examples are merely illustrative and do not in any way limit the scope of the invention as described and claimed. All parts are parts by weight unless otherwise noted.

EXAMPLES

Example 1

Preparation of beta-Hydroxy Carbamate Acrylic Resin

An amount of 500 parts of propylene glycol monomethyl ether was charged to a reactor and heated to reflux (116° C.). A mixture of 520 parts of methylene-2-oxo-1,3-dioxane methacrylate, 260 parts of styrene, 260 parts of 2-ethylhexyl acrylate, 260 parts of laurel methacrylate, 85 parts of t-butyl peroxy-2-ethylhexanoate was added to the reactor over three hours. 135 parts of propylene glycol monomethyl ether was then added. The reaction mixture was held at reflux for an additional hour and twenty minutes.

A solution of 1800 grams of the polymerization product of carbonate-functional acrylic resin, 350 parts of propylene glycol monomethyl ether, and 350 parts of methanol was formed. A stream of ammonia gas was passed throught this acrylic resin solution. After 1.5 hours, an additional 200 parts of methanol was added. The reaction was continued until all of the carbonate was consumed. The reaction mixture was then heated to 123° C. and 800 parts of solvent were removed by distillation. The final product had a carbamate equivalent weight of 493 g/equivalent and a-hydroxyl equivalent weight of 493 g/equivalent.

Examples 2–4

Preparation of Clearcoats

Clearcoats were prepared by mixing together the ingredients indicated in Table 1.

TABLE 1

|  | Example 2 | Example 3 | Example 4 |
|---|---|---|---|
| Resin of Example 1 | 279.2 grams | 263.2 grams | 284.4 grams |
| Crosslinker 1[1] | 124 | — | — |
| Crosslinker 2[2] | 62.8 | — | — |
| Crosslinker 3[3] | — | 157.6 | — |
| Crosslinker 4[4] | — | 76.4 | — |
| Crosslinker 5[5] | — | — | 128 |
| Crosslinker 6[6] | — | — | 56.4 |
| CYMEL ™ 327[7] | 86.4 | 81.6 | 88 |
| UV absorber | 12.6 | 12.6 | 12.6 |
| Hindered amine light stabilizer | 6.0 | 6.0 | 6.0 |
| Flow Additive | 1.5 | 1.5 | 1.5 |
| Dibutyl tin diacetate | 0.8 | 0.8 | 0.8 |
| Methyl isoamyl ketone | 114.5 | 114.7 | 114.2 |

TABLE 1-continued

|  | Example 2 | Example 3 | Example 4 |
|---|---|---|---|
| EXXATE ™ 800[8] | 193.4 | 178.4 | 174.4 |
| Methanol | 7.6 | 7.6 | 7.6 |

[1]70% solution of the isocyanurate of isophorone diisocyanate, blocked with 3,5-dimethylpyrazole
[2]70% solution of the isocyanurate of hexamethylene diisocyanate, blocked with 3,5-dimethylpyrazole
[3]62.4% solution of the isocyanurate of isophorone diisocyanate, blocked with diethylmalonate/ethylacetoacetate
[4]62.7% solution of the isocyanurate of hexamethylene with diisocyanate, blocked with diethylmalonate/ethylacetoacetate
[5]65% solution of the isocyanurate of isophorone diisocyanate, blocked with methylethylketoxime
[6]75% solution of the isocyanurate of hexamethylene diisocyanate, blocked with methylethylketoxime
[7]Available from Cytec Industries, Stamford, CT
[8]Available from Exxon Chemical Co., Houston, TX The clearcoats of Examples 2–4 were applied over commercial solventborne and waterborne black basecoats on primed steel panels and baked for 23 minutes at 290° F. The coated panels were tested for environmental etch resistance by exposure in Jacksonville, Fla. for 14 weeks. The performance of the experimental coatings for etch resistance was rated on a scale of 1–10, with 1 being no visible etching and 10 being total failure. The results are shown in Table 2.

TABLE 2

| Basecoat | Clearcoat | Etch Rating |
|---|---|---|
| black waterborne | Example 2 | 4 |
| black solventborne | Example 2 | 4 |
| black waterborne | Example 3 | 4 |
| black solventborne | Example 3 | 7 |
| black waterborne | Example 4 | 4 |
| black solventborne | Example 4 | 7 |

The invention has been described in detail with reference to preferred embodiments thereof. It should be understood, however, that variations and modifications can be made within the spirit and scope of the invention.

What is claimed is:

1. A curable coating composition, comprising:
   (a) a compound having hydroxyl functionality and carbamate functionality of the structure

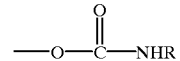

wherein R is H or alkyl;
   (b) a polyisocyanate crosslinking agent; and
   (c) an aminoplast crosslinking agent,
   wherein the effective equivalents of the aminoplast crosslinking agent is equal to or less than the equivalents of carbamate functionality, and further wherein the effective equivalents of polyisocyanate crosslinking agent is equal to or less than the equivalents of hydroxyl functionality.

2. A curable coating composition according to claim 1, wherein the compound of (a) has a plurality of hydroxyl groups.

3. A curable coating composition according to claim 1, wherein the compound of (a) has, on average, a plurality of carbamate groups per molecule.

4. A curable coating composition according to claim 1, wherein the compound of (a) is a monomeric compound.

5. A curable coating composition according to claim 1, wherein the compound of (a) is a resin or polymer.

6. A curable coating composition according to claim 1, wherein the compound of (a) is an acrylic polymer.

7. A curable coating composition according to claim 6, wherein the acrylic polymer has a number average molecular weight of from about 1000 to about 40,000.

8. A curable coating composition according to claim 1, wherein the compound of (a) is a hydroxyalkyl carbamate.

9. A curable coating composition according to claim 1, wherein the ratio of effective equivalents of the aminoplast crosslinking agent to equivalents of carbamate functionality is at least about 0.6:1.

10. A curable coating composition according to claim 1, wherein the ratio of effective equivalents of the aminoplast crosslinking agent to equivalents of carbamate functionality is at least about 0.8:1.

11. A curable coating composition according to claim 1, wherein the ratio of effective equivalents of polyisocyanate crosslinking agent to equivalents of hydroxyl functionality is at least about 0.5:1.

12. A curable coating composition according to claim 1, wherein the ratio of effective equivalents of polyisocyanate crosslinking agent to equivalents of hydroxyl functionality is at least about 0.7:1.

13. A curable coating composition according to claim 1, wherein the compound of (a) is an adduct of a beta-hydroxy carbamate compound and an aliphatic polyisocyanate.

14. A curable coating composition according to claim 1, wherein the polyisocyanate crosslinking agent is at least one member selected from the group consisting of the isocyanurate of isophorone diisocyanate, the isocyanurate of hexamethylene diisocyanate, and mixtures thereof.

15. A curable coating composition according to claim 1, wherein the aminoplast crosslinking agent is a melamine formaldehyde resin.

16. A method of coating an article, comprising the steps of:
(a) applying onto the article, as an outermost coating layer, a curable coating composition comprising:
(i) a compound having hydroxyl functionality and carbamate functionality of the structure

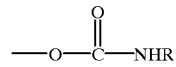

wherein R is H or alkyl;
(ii) a polyisocyanate crosslinking agent; and
(iii) an aminoplast crosslinking agent,
wherein the effective equivalents of the aminoplast crosslinking agent is equal to or less than the equivalents of carbamate functionality, and further wherein the effective equivalents of polyisocyanate crosslinking agent is equal to or less than the equivalents of hydroxyl functionality; and b) curing the coating composition to form a coated article.

17. A method of coating an article according to claim 16, wherein the carbamate-functional compound and the aminoplast crosslinking agent are reacted to a sufficient extent during curing to prevent sagging of the coating.

18. An article coated according to the method of claim 16.

* * * * *